Feb. 27, 1951 — J. D. WICKS ET AL — 2,543,481
OIL FILTER REPLACEMENT UNIT
Filed Feb. 7, 1949 — 2 Sheets-Sheet 1
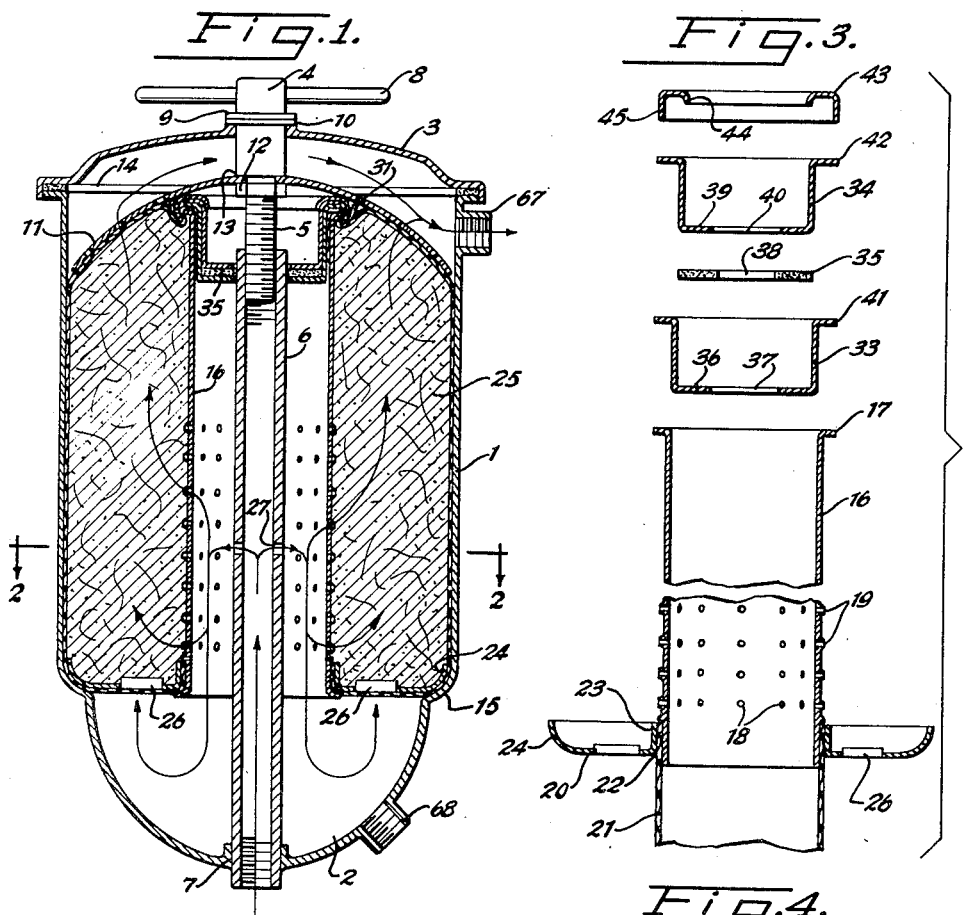
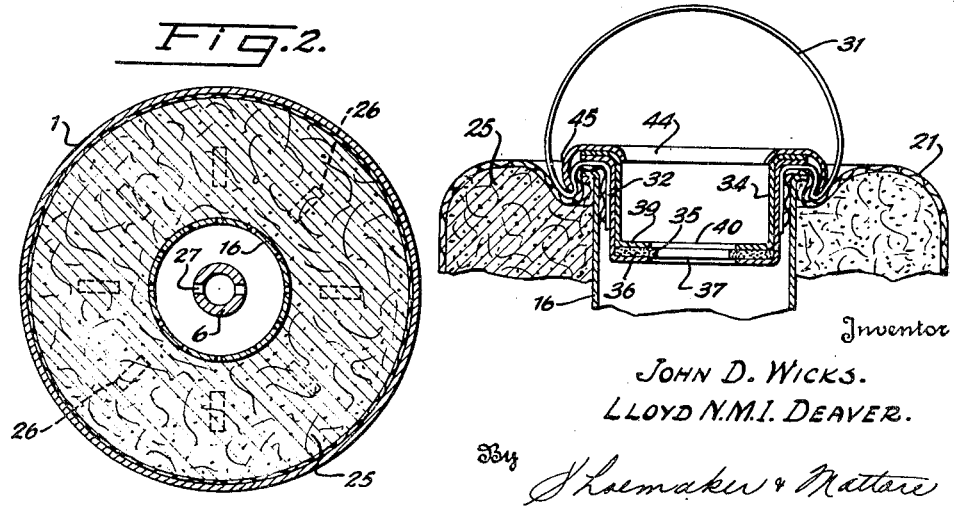
Inventor
JOHN D. WICKS.
LLOYD N.M.I. DEAVER.
ATTORNEY Feb. 27, 1951 J. D. WICKS ET AL 2,543,481
OIL FILTER REPLACEMENT UNIT
Filed Feb. 7, 1949 2 Sheets-Sheet 2
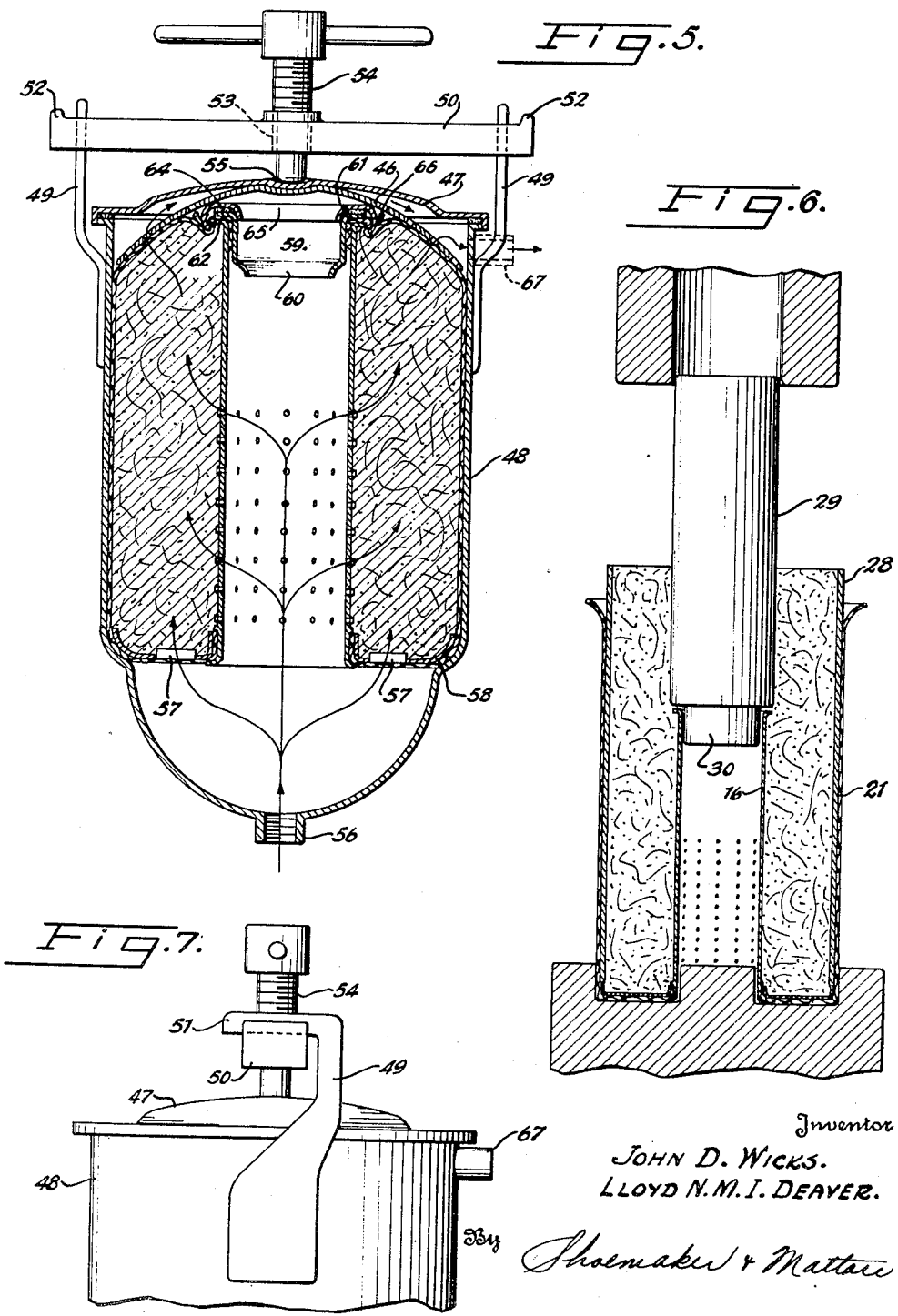
Inventor
JOHN D. WICKS.
LLOYD N. M. I. DEAVER.
ATTORNEYS Patented Feb. 27, 1951

2,543,481

UNITED STATES PATENT OFFICE 2,543,481

OIL FILTER REPLACEMENT UNIT

John Doane Wicks and Lloyd N. M. I. Deaver, Gastonia, N. C., assignors to Wix Accessories Corporation, Gastonia, N. C., a corporation of North Carolina Application February 7, 1949, Serial No. 74,926

10 Claims. (Cl. 210—148)

The invention relates to oil filters, particularly a filter used in the oiling system of internal combustion engines used on automotive vehicles.

An object of the present invention is to improve sock type oil filters in which the oil flows endwise of the filtering material as well as radially outwardly from the center through a portion of the filtering material and endwise through the remaining portion.

In oil filters of this particular type, the gasket must be located inwardly from the end of the filtering element in order to cooperate with the filter center pipe which extends to a point below the end of the filter element and it is an object of the present invention to provide a gasket cup assembly capable of securely fastening the upper end of the fabric sock to the flanged upper end of the center tube and of firmly supporting the gasket in proper position with relation to the upper end of the filter element and the center filter pipe.

Another object of the invention is to provide a gasket cup assembly capable of also securing the hooked ends of the wire handle to the replacement unit to facilitate ready removal of the replacement unit when necessary or desirable to substitute a new filter unit for one which has been in use.

Another object of the invention is to provide a rigid structure for securing the lower end of the fabric sock to the lower end of the perforated center tube which will cooperate with the gasket cup assembly to provide a rigid end-to-end construction adapted to facilitate installation of a new fibrous filtering material or element by providing a rigid center structure against which to press.

Another object of the invention is to enable the improvements of the present invention to be used in a filter casing having no center pipe, as well as in filter casings provided with center pipes.

It is also an object of the invention to provide a gasket cup assembly at the upper end of the center tube and a lower sock retaining plate at the lower end of the center tube of simple construction and capable of rapid and economic manufacture and easy application to the center tube.

Another object of the invention is to provide a simple, practical and efficient oil filter in which oil enters the filter case at the bottom end or through a cross drilled center pipe and passes through perforations into the filtering medium or through openings in a bottom plate and then passes upwardly through the filtering material where clean oil leaves the filtering element through a perforated dome which confines the upper end of the filtering unit and in which filtering unit a substantial amount or appreciable depth of filtering material will be located above the uppermost perforation in the filter tube to insure that oil leaving the filter unit will be clean and free from foreign particles.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings—

Fig. 1 is a central vertical sectional view of an oil filter having a center pipe and provided with a replacement filter unit constructed in accordance with this invention;

Fig. 2 is a horizontal sectional view taken on the line 2—2 of Fig. 1;

Fig. 3 is an exploded sectional view of the gasket cup assembly, the perforated center tube, the lower sock-securing plate and a portion of a fabric sock;

Fig. 4 is an enlarged detail vertical sectional view of the upper portion of the filter unit illustrating the construction of the gasket cup assembly;

Fig. 5 is a central vertical sectional view showing the replaceable filtering unit applied to a filter casing having no center tube;

Fig. 6 is a vertical sectional view of a mold illustrating the method of filling the fabric sock with fibrous filtering material to provide the filtering element;

Fig. 7 is a side elevation of the upper portion of the filter illustrated in Fig. 5 of the drawings.

Referring particularly to Figs. 1 to 4, inclusive, the filter replacement unit is shown applied to a filter consisting of a substantially cylindrical casing 1 having an approximately semispherical oil sump 2 at the bottom and provided with a cover 3 secured to the casing 1 by a lock bolt 4 having a threaded lower portion 5 which is threaded into the upper end of a center pipe 6. The center pipe 6 is rigidly secured to the sump 2 of the casing 1 and extends through a central opening 7 thereof. The lock bolt which is provided at its upper end with a handle or grip 8 for ready rotation thereof, has a collar or flange 9 at its upper portion for engaging the cover 3, a suitable gasket or packing 10 being interposed between the collar or flange 9 and the closure cover 3.

A perforated dome 11 is secured to the bolt 4 by a lock nut 12. The perforated dome 11, which confines the replacement filter unit within the casing 1 has a central opening to receive the threaded portion 5 of the bolt 4 and it fits against a shoulder 13 formed by reducing the bolt to provide the threaded portion 5. A suitable gasket 14 is also interposed between the cover 3 on the body of the casing. The casing 1 is provided adjacent the sump 2 with a constricted curved portion 15 to provide a seat at the top of the sump 2 for the replacement filter unit.

The foregoing is conventional construction. The filter replacement unit comprises in its construction a central tube 16 provided at its upper end with an outturned annular flange 17 and provided in its lower portion with pricked-out perforations 18 forming exterior projections 19 for limiting the upward movement of a lower sock-confining plate 20 which is fitted on the lower end of the perforated tube for securing one end of a fabric sock 21 to the tube. The lower plate 20, which is circular, is provided with a central opening 22 and it has an upwardly extending extruded tubular portion or flange 23 which fits over one end of the fabric sock 21 and secures the same to the lower end of the perforated tube. The exteriorly projecting portions 19 formed by the pricked-out perforations are adapted to form a stop for the lower plate 20 so that the lower plate will be rigidly secured to the lower end of the central tube when the sock is filled and is secured to the upper end of the center tube. The outer peripheral portion 24 of the lower plate is flared upwardly so that the lower plate forms a dished seat for the lower end of the fibrous filtering element 25. The intermediate portion of the lower horizontal plate 20 is provided with openings 26 preferably consisting of oblong slots but which may be of any other desired form and which permit a portion of the oil entering the space between the center pipe and the center tube through openings 27 to pass upwardly through the openings and enter the filtering element 25 at the lower end thereof.

One end of the sock is fitted on the lower unflanged end of the center tube and the lower plate is slipped over the sock which is held between the annular flange 23 and the lower end of the center tube 16. The sock is then turned inside out over the lower end plate 20 and is then stretched over the outside of a mold cylinder 28, as illustrated in Fig. 6 of the drawings. The sock is then filled with fibrous filtering material which is compressed within the sock between the mold cylinder and the center tube 16 and a plug 29 which has a reduced end 30 to fit within the upper flanged end of the center tube 16. With this arrangement the fibrous material may be compressed to the desired degree, after which the plug is removed from the center tube and the sock is also removed from the mold cylinder.

After the fabric sock, the compressed fibrous material, the center tube and the lower plate have been removed from the mold, the open upper end of the sock is then closed over the upper end of the fibrous material and is tucked into the flanged end of the center tube. A wire handle 31 is then laid on top of the sock, with hooked ends 32 thereof projecting into the center tube. Gasket retainer cups 33 and 34 and a gasket 35 are dropped into the upper end of the center tube. The gasket cup 33 is substantially cylindrical and supports the gasket 35 and is provided with a bottom 36 having a central opening 37 through which passes the center pipe. The gasket 35, which may be made of any suitable material and which consists of a disc having a central opening 38 to receive the center pipe, is placed upon the bottom cup 33. The gasket retaining cup 34, which is also cylindrical, fits snugly within the gasket retaining cup 33 and it is provided with a bottom 39 having an opening 40 through which passes the center pipe 5. The openings 37, 38 and 40 are the same diameter and the lower gasket retaining cup 33 is provided at its upper edge with an outwardly extending annular flange 41 and the upper gasket retaining cup 34 is provided with a similar flange 42 which is arranged upon the flange 41 when the parts are assembled. The gasket and the upper and lower gasket retaining cups are assembled before being placed within the upper end of the center tube and after the gasket cups and the gasket are introduced into the center tube a closure cap 43 is placed over the gasket retaining cups and is crimped around the flanges 41 and 42 and around the flange 17 of the center tube, thereby rigidly securing the gasket cup assembly and the wire handle to the upper end of the center tube.

The closure cap 43 is annular and is provided with inner and outer flanges 44 and 45. The inner annular flange 44 is slightly tapering and the outer annular flange 45 is cylindrical, as clearly illustrated in Fig. 3 of the drawings, before being crimped around the flanges of the gasket retaining cups and the flange of the center tube. The flange 44 is slightly curved to provide a rounded inner edge for the closure cap, and the crimping of the outer flange 45 securely grips the fabric sock. The wire handle enables the filter unit to be readily removed when it is necessary to replace the same.

In Figs. 5 and 7 the filter replacement unit is shown applied to a filter casing in which there is no center pipe and in which a perforated dome 46 is held between the filter replacement unit and the cover 47 of the casing 48 which is constructed substantially the same as the casing 1, with the exception of the means for securing the cover to the body of the casing. The body of the casing is provided with upwardly extending approximately inverted hook-shaped arms 49 rigid with the casing 48 and adapted to be engaged by a cross head or bar 50. The ends of the cross head or bar 50, which are engaged beneath the bill portions 51 of the arms, are provided with terminal flanges or enlargements 52 to prevent excessive endwise movement of the cross head or bar 50. At the center the cross head or bar 50 is provided with an opening 53 which is threadedly engaged by a bolt 54. The bolt 54 engages a central depression or seat 55 of the cover 47 and the perforated dome is also provided with a depression or concavity which conforms with the configuration of the lower face of the cover at the seat 55.

The oil enters the sump 56 at the lower end of the casing 48 and passes upward through openings 57 in a lower sock-retaining plate 58 constructed and arranged the same as the plate 20, and as the construction of said lower plate 58 and the assembling of the sock on the lower end of the center tube are the same as heretofore described, further description thereof is deemed unnecessary. The gasket cup assembly at the upper end of the center tube for securing the upper end of the sock within said tube comprises a tubular member 59 of cylindrical form having a slightly reduced lower end 60 and provided at its upper end with an outwardly extending annular flange 61 which is arranged upon the flange 62 of the center tube 63, the upper end of the sock being interposed between the tubular member and the upper end of the center tube. A gasket 64 is arranged within a closure cap 65 which is crimped around the flange of the tubular member and the flange of the upper end of the center tube, the gasket being arranged within the closure cap and interposed between the same and the flange of the tubular member, and the parts are firmly secured to the upper flanged end of the center tube when the cap is crimped around the flanged upper end of the center tube.

As in the form of the invention illustrated in Figs. 1 to 4, inclusive, the hooked ends of a handle 66 are inserted in the upper end of the center tube and the handle laid upon the sock and is securely fastened to the filtering unit when the closure cap is crimped around the flanged upper end of the center tube.

In each form of the invention the casing is provided with an outlet nipple 67 which is connected with the crank case in the usual manner for conveying clean filtered oil to the same. Also in each form of casing the sump is provided with a drain opening 68 designed to be fitted with any suitable closure means.

What we claim is:

1. A filter replacement unit including a center tube, a fabric sock tucked into the upper end of the center tube, a gasket supporting assembly carried by and constituting a portion of the replacement unit and comprising a cylindrical member extending into the upper end of the center tube and engaging the fabric sock, an annular closure cap located within the upper end of the center tube and crimped around the upper end of the cylindrical member and the center tube, and a gasket arranged within the gasket supporting assembly interiorly of the center tube and spaced below the upper end thereof and rigidly connected with the center tube by said assembly.

2. A filter replacement unit including a center tube, a fabric sock tucked into the upper end of the center tube, and a gasket cup assembly carried by and constituting a portion of the replacement unit and comprising an outer cylindrical cup extending into the upper end of the center tube and engaging the fabric sock and having a bottom gasket supporting portion, a gasket arranged within the outer cup upon the bottom supporting portion thereof, an inner cylindrical cup fitted within the outer cylindrical cup and engaging the gasket, and an annular closure cap crimped around the upper end of the center tube and the inner and outer cups and rigidly securing the same to the upper end of the center tube.

3. A filter replacement unit including a center tube, a fabric sock tucked into the upper end of the center tube, a wire handle arranged upon the fabric sock and having hooked terminals extending into the center tube, and a gasket cup assembly comprising an outer cylindrical cup extending into the center tube and engaging the fabric sock and the terminals of the wire handle and having a bottom gasket supporting portion, a gasket arranged within the outer cup upon said bottom supporting portion thereof, an inner cylindrical cup fitted within the outer cylindrical cup and engaging the gasket, and an annular closure cap crimped around the upper end of the center tube and the inner and outer cups and rigidly securing said cups to the center tube.

4. A filter replacement unit including a center tube provided at its upper end with an outwardly extending flange, a fabric sock tucked into the upper end of the center tube, and a gasket cup assembly comprising an outer cylindrical cup extending into the center tube and engaging the fabric sock and provided at its upper end with an outwardly extending flange engaging over the flange of the center tube, a gasket arranged within the outer cylindrical cup and supported by the same, an inner cylindrical cup fitted within the outer cylindrical cup and engaging the gasket and provided at its upper end with an outwardly extending flange arranged upon the flange of the outer cup, and an annualar closure cap having an inner depending flange extending into and fitting the inner cup, said closure cap being provided with an outer peripheral flange crimped around the flanges of the inner and outer cups and the flange of the center tube.

5. A filter replacement unit including a center tube provided at its upper end with an outwardly extending flange, a fabric sock tucked into the upper end of the center tube, and a gasket cup assembly including an outer cylindrical cup extending into the center tube and engaging the fabric sock and provided at its upper end with an outwardly extending flange engaging over the flange of the center tube, said outer cup being provided with a bottom having a central opening, a gasket arranged upon the bottom of the outer cup, an inner cup fitted within the outer cup and provided at its upper end with an outwardly extending flange fitted against the flange of the outer cup, said inner cup being provided with a bottom having a central opening and fitted against the gasket, and an annular closure cap having an inner depending flange extending into the inner cup and fitting the same, said closure cap being provided with an outer peripheral flange crimped around the flanges of the inner and outer cups and the flange of the center tube.

6. A filter replacement unit including a center tube having out-pricked perforations, a lower sock securing plate having a central opening receiving the lower end of the center tube, said lower plate being held against upward movement on the center tube by said out-pricked perforations, and a fabric sock stretched over the lower plate and having one end surrounding the center tube and held between the same and the lower plate.

7. A filter replacement unit including a center tube provided with out-pricked perforations, a lower sock securing plate having a central opening and extruded thereat to provide a tubular portion fitted on the lower end of the center tube and held against upward movement thereon by said out-pricked perforations, and a fabric sock stretched over said lower plate and having one end surrounding the lower end of the center tube and held between the same and the extruded portion of the lower plate, said plate being provided between its outer periphery and its extruded portion with spaced openings to produce an upward flow of liquid through the filter replacement unit and having its outer peripheral portion curved upwardly to form a flaring dished seat for a fibrous filtering element.

8. A filter replacement unit including a center tube having a perforated lower portion and provided at its upper end with an outwardly extending flange, a lower sock securing plate provided with a central opening and having an extruded portion thereat fitted on the lower end of the center tube and held against upward movement, a fabric sock stretched over the lower plate and having one end surrounding the lower end of the center tube and held between the same and the extruded portion of the lower plate, said sock extending upwardly from the lower plate and having its other end tucked into the upper end of the center tube, a gasket supporting assembly comprising a cylindrical member extending into the upper end of the center tube and engaging the fabric sock and provided with an outwardly extending flange engaging over the flange of the center tube, an annular closure cap crimped around the flanges of the cylindrical member and the center tube, and a gasket contained within said assembly and rigidly connected with the center tube by said assembly, and a fibrous filtering element contained within the fabric sock.

9. A filter replacement unit including a center tube having a perforated lower portion and provided at its upper end with an outwardly extending flange, a lower sock securing plate provided with a central opening and having an extruded portion thereat fitted on the lower end of the center tube and held against upward movement, a fabric sock stretched over the lower plate and having one end surrounding the lower end of the center tube and held between the same and the extruded portion of the lower plate, said sock extending upwardly from the lower plate and having its other end tucked into the upper end of the center tube, a gasket cup assembly comprising an outer cylindrical cup extending into the inner tube and having a central opening at the bottom and provided at its top with an outwardly extending flange engaging over the flange of the center tube, a gasket arranged interiorly of the center tube within the outer cup upon the bottom thereof, an inner cylindrical cup having an opening in its bottom and fitted within the outer cup and engaging the gasket and provided at the top with an outwardly extending flange arranged upon the flange of the outer cup, and an annular closure cap crimped around the flanges of the inner and outer cups and the center tube and rigidly maintaining the gasket in position for sealing engagement with the pipe of a filter casing at a point below the upper end of the center tube, and a fibrous filtering element contained within the fabric sock.

10. A filter replacement unit including a perforated center tube provided at the upper end with an outwardly extending annular flange, a fabric sock tucked into the upper end of the center tube, a gasket supporting assembly carried by and constituting a portion of the replacement unit and comprising a cylindrical member arranged within the upper end of the center tube and engaging the fabric sock, and provided at the top with an outwardly extending annular flange supported upon the annular flange of the center tube, an annular closure cap crimped around the annular flange of the cylindrical member and said flange of the center tube and rigidly connecting the gasket assembly with the center tube, and a gasket arranged within the gasket supporting assembly and rigidly connected with the center tube by said assembly.

JOHN DOANE WICKS.
LLOYD N. M. I. DEAVER.

REFERENCES CITED

The following references are of record in the file of this patent:

UNITED STATES PATENTS

| Number | Name | Date |
| --- | --- | --- |
| 2,334,664 | Wicks | Nov. 16, 1943 |
| 2,345,849 | Winslow et al. | Apr. 4, 1944 |
| 2,367,745 | Wicks | Jan. 23, 1945 |

OTHER REFERENCES

The Deluxe Filter Instruction Book, copyright 1936 by The Deluxe Products Corporation, La Porte, Indiana, U. S. A., page 2.